United States Patent
Mosteller

(10) Patent No.: US 10,824,926 B2
(45) Date of Patent: *Nov. 3, 2020

(54) WEIGHTED TRANSACTION CARD

(71) Applicant: CPI Card Group - Colorado, Inc., Littleton, CO (US)

(72) Inventor: Barry Mosteller, Castle Pines, CO (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,345

(22) Filed: Oct. 9, 2019

(65) Prior Publication Data

US 2020/0117964 A1 Apr. 16, 2020

Related U.S. Application Data

(63) Continuation of application No. 16/278,612, filed on Feb. 18, 2019, now Pat. No. 10,445,628, which is a continuation of application No. 15/690,704, filed on Aug. 30, 2017, now Pat. No. 10,255,536, which is a continuation of application No. 15/234,733, filed on Aug. 11, 2016, now Pat. No. 9,779,343, which is a continuation of application No. 14/834,200, filed on Aug. 24, 2015, now Pat. No. 9,430,724, which is a continuation of application No. 14/501,386, filed on Sep. 30, 2014, now Pat. No. 9,117,155, which is a continuation of application No. 13/840,621, filed on Mar. 15, 2013, now Pat. No. 8,857,722.

(60) Provisional application No. 61/674,143, filed on Jul. 20, 2012.

(51) Int. Cl.
*G06K 19/02* (2006.01)
*G06K 19/077* (2006.01)
*B32B 37/18* (2006.01)
*B32B 38/00* (2006.01)
*B32B 15/08* (2006.01)

(52) U.S. Cl.
CPC ............ *G06K 19/022* (2013.01); *B32B 15/08* (2013.01); *B32B 37/185* (2013.01); *B32B 38/0004* (2013.01); *G06K 19/02* (2013.01); *G06K 19/07722* (2013.01); *G06K 19/07745* (2013.01); *B32B 2425/00* (2013.01); *Y10T 156/1052* (2015.01); *Y10T 428/239* (2015.01)

(58) Field of Classification Search
CPC .................................................. G06K 19/022
USPC ................................ 235/375, 380, 492, 493
See application file for complete search history.

(56) References Cited

U.S. PATENT DOCUMENTS

| | | |
|---|---|---|
| 3,688,088 A | 8/1972 | Brown et al. |
| 3,855,033 A | 12/1974 | Staats |
| 3,896,726 A | 7/1975 | Staats |
| 3,949,501 A | 4/1976 | Andrews et al. |
| 4,097,279 A | 6/1978 | Whitehead |

(Continued)

*Primary Examiner* — Allyson N Trail
(74) *Attorney, Agent, or Firm* — Dorsey & Whitney LLP

(57) ABSTRACT

Weighted transaction cards and methods of manufacturing the same. The weighted transaction cards may include a tungsten member that comprises at least a portion of a layer of the transaction card. The tungsten member may be encapsulated and/or disposed in an opening of a surround to define an inlay. The inlay may be laminated with one or more additional layers according to traditional card manufacturing techniques (e.g., a hot lamination process). The weighted transaction cards may have a weight significantly greater than traditional plastic transaction cards.

21 Claims, 12 Drawing Sheets

(56) References Cited

U.S. PATENT DOCUMENTS

| | | |
|---|---|---|
| 4,223,918 A | 9/1980 | Smoczynski |
| 4,568,824 A | 2/1986 | Gareis et al. |
| 4,592,976 A | 6/1986 | Whitehead |
| 4,677,285 A | 6/1987 | Taniguchi |
| 4,746,392 A | 5/1988 | Hoppe |
| 4,897,533 A | 1/1990 | Lyszczarz |
| 4,931,629 A | 6/1990 | Frankfurt |
| 5,215,792 A | 6/1993 | Miller |
| 5,513,019 A | 4/1996 | Cueli |
| 5,559,370 A | 9/1996 | Berney |
| 5,667,876 A | 9/1997 | Radlicz |
| 5,690,773 A | 11/1997 | Fidalgo et al. |
| 5,877,941 A | 3/1999 | Ryu |
| 5,965,867 A | 10/1999 | Haghiri-tehrani |
| 6,006,456 A | 12/1999 | Hiromachi et al. |
| 6,025,283 A | 2/2000 | Roberts |
| 6,164,548 A | 12/2000 | Curiel |
| 6,202,931 B1 | 3/2001 | Billebaud |
| 6,239,976 B1 | 5/2001 | Templeton et al. |
| 6,352,604 B2 | 3/2002 | Droz |
| 6,471,128 B1 | 10/2002 | Corcoran et al. |
| 6,644,552 B1 | 11/2003 | Herslow |
| 6,942,156 B2 | 9/2005 | Ohta et al. |
| 6,986,467 B2 | 1/2006 | Takahashi et al. |
| 7,269,021 B2 | 9/2007 | Gundlach et al. |
| 7,287,704 B2 | 10/2007 | Herslow |
| 7,306,163 B2 | 12/2007 | Scholz et al. |
| 7,398,917 B2 | 7/2008 | Aibazov et al. |
| 7,413,128 B2 | 8/2008 | Waldo et al. |
| 7,494,057 B2 | 2/2009 | Lasc et al. |
| 7,503,503 B2 | 3/2009 | Riedl et al. |
| 7,530,491 B2 | 5/2009 | Lasch et al. |
| 7,588,184 B2 | 9/2009 | Gandel et al. |
| D602,986 S | 10/2009 | Skelding et al. |
| D623,690 S | 9/2010 | Skelding et al. |
| 7,819,310 B2 | 10/2010 | Lasch et al. |
| 7,823,777 B2 | 11/2010 | Varga et al. |
| D635,186 S | 3/2011 | Skelding et al. |
| 7,971,786 B2 | 7/2011 | Lasch et al. |
| D643,062 S | 8/2011 | Skelding et al. |
| 8,033,457 B2 | 10/2011 | Varga et al. |
| 8,061,618 B2 | 11/2011 | Mosteller |
| 8,079,514 B2 | 12/2011 | Lasch et al. |
| 8,186,582 B2 | 5/2012 | Varga et al. |
| 8,305,764 B2 | 11/2012 | Rietzler |
| 8,413,894 B2 | 4/2013 | Bona et al. |
| 8,434,675 B2 | 5/2013 | Faith |
| 8,448,868 B2 | 5/2013 | Mueller-hipper et al. |
| 8,594,730 B2 | 11/2013 | Bona et al. |
| 8,672,232 B2 | 3/2014 | Herslow |
| 8,807,437 B2 | 8/2014 | Reed et al. |
| 8,944,810 B2 | 2/2015 | Herslow |
| 9,058,548 B2 | 6/2015 | Reed et al. |
| 2002/0070279 A1 | 6/2002 | Zausner |
| 2004/0011877 A1 | 1/2004 | Reppermund |
| 2005/0230822 A1 | 10/2005 | Tran |
| 2006/0124753 A1 | 6/2006 | Scholz et al. |
| 2007/0089831 A1 | 4/2007 | Herslow et al. |
| 2009/0169776 A1 | 7/2009 | Herslow |
| 2011/0020606 A1 | 1/2011 | Herslow et al. |
| 2011/0031319 A1 | 2/2011 | Kiekhaefer et al. |
| 2011/0073660 A1 | 3/2011 | Lawyer |
| 2011/0108629 A1 | 5/2011 | Mueller-hipper et al. |
| 2011/0140841 A1 | 6/2011 | Bona et al. |
| 2011/0189620 A1 | 8/2011 | Herslow |
| 2012/0204419 A1 | 8/2012 | Varga et al. |
| 2012/0313754 A1 | 12/2012 | Bona |
| 2013/0228628 A1 | 9/2013 | Bona et al. |
| 2013/0255078 A1 | 10/2013 | Cox |
| 2013/0255848 A1 | 10/2013 | Cox |
| 2013/0258622 A1 | 10/2013 | Cox |
| 2013/0260065 A1 | 10/2013 | Cox |
| 2013/0261262 A1 | 10/2013 | Cox |
| 2013/0320095 A1 | 12/2013 | Blum |
| 2014/0052630 A1 | 2/2014 | Bona et al. |
| 2015/0136858 A1 | 5/2015 | Finn et al. |
| 2015/0269477 A1 | 9/2015 | Finn et al. |

WEIGHTED TRANSACTION CARD

RELATED APPLICATIONS

This application is a continuation of U.S. patent application Ser. No. 16/278,612, filed on Feb. 18, 2019, issued as U.S. Pat. No. 10,445,628 on Oct. 15, 2019, entitled "WEIGHTED TRANSACTION CARD," which is a continuation of U.S. patent application Ser. No. 15/690,704, filed Aug. 30, 2017, issued as U.S. Pat. No. 10,255,536 on Apr. 9, 2019, entitled "WEIGHTED TRANSACTION CARD," which is a continuation of U.S. patent application Ser. No. 15/234,733, filed Aug. 11, 2016, issued as U.S. Pat. No. 9,779,343 on Oct. 3, 2017, entitled "WEIGHTED TRANSACTION CARD," which is a continuation of U.S. patent application Ser. No. 14/834,200, filed Aug. 24, 2015, issued as U.S. Pat. No. 9,430,724 on Aug. 30, 2016, entitled "WEIGHTED TRANSACTION CARD," which is a continuation of U.S. patent application Ser. No. 14/501,386, filed Sep. 30, 2014, issued as U.S. Pat. No. 9,117,155 on Aug. 25, 2015, entitled "WEIGHTED TRANSACTION CARD," which is a continuation of U.S. application Ser. No. 13/840,621 filed Mar. 15, 2013, issued as U.S. Pat. No. 8,857,722 on Oct. 14, 2014, entitled "WEIGHTED TRANSACTION CARD," which claims benefit of priority to U.S. Provisional Patent Application No. 61/674,143 filed Jul. 20, 2012, entitled "WEIGHTED TRANSACTION CARD," all of which applications are incorporated herein by reference in their entirety.

FIELD OF THE INVENTION

The prevalence of the use of transaction cards continues to grow. With the increasing use of transaction cards by individuals for value in purchases, the market for different types of transaction cards also continues to grow.

In this regard, a number of different varieties of cards are offered to consumers that may each offer a unique set of benefits and features. For example, a number of ultra-premium transaction card types have been proposed that are marketed to individuals with high net worth that also establish large balances using a transaction card. Card issuers that offer such ultra-premium transaction card types often provide associated premium services to holders of such ultra-premium transaction cards such as, for example, concierge services, increased involvement rewards programs, increased travel benefits, consumer protection features with respect items purchased using such cards, or other ultra-premium services not typically offered with standard transaction cards.

In addition to ultra-premium services offered in connection with such transaction cards, card issuers may also wish to provide a premium physical card as evidence of the ultra-premium nature of the transaction card. In fact, the awareness of such ultra-premium transaction cards has grown to the point where such ultra-premium cards have become associated with the high net worth individuals to whom such cards are issued. In this regard, such ultra-premium cards have become status symbols for many individuals.

To further increase the exclusivity of such cards and to differentiate such cards from traditional transaction cards, it has been proposed to manufacture cards using different precious metals rather than the typical plastic materials employed in traditional cards. For example, titanium, palladium, other precious metals, or the like have been proposed to be used to construct ultra-premium transaction cards. However, to produce precious metal cards of the kind proposed for use in the ultra-premium transaction card market, it is often the case that traditional methods of card manufacture are not applicable. In turn, the cost of such cards is often much greater than the cost associated with the production of traditional transaction cards made from plastics and the like. For example, art work and other indicia (e.g., account numbers, a name associated with the account, expiration dates, verification codes, terms and conditions, and/or other necessary indicia) associated with a transaction card may be provided on a transaction card. In the case of metallic cards, such art work and/or other indicia may be directly created in the precious metal of the card by such processes as laser etching, machining, etching, or other relatively costly processes. It has further been proposed that layers including the transaction card indicia be adhered to the metal substrate. However, each of these approaches requires costly manufacturing techniques not normally associated with the production of transaction cards such that the cost for each card may be much more than traditional transaction cards. Furthermore, the cost of the raw materials for precious metal cards may be much greater than the materials used to construct traditional plastic cards. In this regard, many card issuers that offer ultra-premium transaction cards of this nature do not directly recoup the increased production costs of such cards when offering such cards to individuals (e.g., by way of fixed initiation fees or annual fees) with the understanding that the high net worth individuals to whom the card is offered will more than likely use the transaction card to a degree so as to provide substantial revenue to the card issuer despite the loss associated with the production of the card. However, the reach of such ultra-premium cards has been correspondingly limited to a relatively small portion of the transaction card market as a result of the difficulty in large scale manufacture of ultra-premium cards.

SUMMARY

The present disclosure generally relates to weighted transaction cards that may provide characteristics (e.g., corresponding to the look and/or feel of the card) that provide an ultra-premium quality to transaction cards that may be satisfying to a card user. However, in contrast to previous ultra-premium transaction card production techniques, the weighted transaction cards described herein may employ traditional card manufacturing techniques in their construction so as to significantly reduce the costs associated with production of such cards. In this regard, a card with detectable physical properties (e.g., the weight of the card) that are evident when the card is handled may be produced for costs much less than traditional ultra-premium cards made from precious metals and may be produced for costs approaching the cost of traditional plastic cards. In this regard, such weighted transaction cards may provide a similar impression of quality or an ultra-premium nature without the high production costs normally associated with ultra-premium transaction cards. As such, the segment of the market to which such weighted cards may be economically offered may be much greater than the segment of the market to which traditional ultra-premium cards are offered.

In this regard, a first aspect presented herein includes a transaction card in which at least a portion of a first layer of the transaction card comprises a metal portion. The transaction card may also include a second layer that may be attached to the first layer.

In an embodiment, the second layer may be adhered to at least part of a lateral extent of a side of the metal portion. In an application, the metal portion may be substantially homogenous. In this regard, the metal portion may comprise a solid metal member. In an implementation, the metal portion may be single piece member. In an embodiment, the metal portion may comprise a tungsten member. In this regard, at least a portion of the tungsten member may comprise tungsten. For example, in an embodiment, at least a majority of the tungsten member may comprise tungsten. In some preferred applications, the tungsten member may comprise at least 75%, at least 80%, at least 85%, or even at least 90% tungsten.

In an embodiment a weight of the tungsten member may comprise at least about 40% of the total weight of the transaction card, and in another implementation, the weight of the tungsten member may comprise at least about 50% of the total weight of the transaction card. In an embodiment, the total weight of the tungsten member may comprise less than about 90% of the total weight of the transaction card, and in another application, the total weight of the tungsten may comprise less than about 80% of the total weight of the transaction card. In an implementation, the weight of the tungsten member may be at least about 8 g, and in an embodiment, the weight of the tungsten member may be at least about 10 g. In an embodiment, the weight of the tungsten member may be less than about 22.6 g, and in a certain implementation the weight of the tungsten member may be less than about 14 g. In an embodiment, the total weight of the transaction card may be at least about 10 g, and in an implementation the total weight of the transaction card may be at least about 15 g. In an embodiment, the total weight of the transaction card may be less than about 25 g, and in an application, the total weigh of the transaction card may be less than about 20 g.

In an embodiment, for a given deflection test, the weighted transaction card may undergo a reduction in deflection of at least about 30% from the deflection of a traditional plastic transaction card, and in an application, the weighted transaction card may undergo a reduction in deflection of at least about 40% from the deflection of a traditional plastic transaction card. In an application, for a given test, the weighted transaction card may undergo a reduction in deflection of less than about 90% from the deflection of a traditional plastic transaction card, and in an application, the weighted transaction card undergo a reduction in deflection of less about 80% from the deflection of a traditional plastic transaction card.

In a characterization, the weighted card may be deflectable, e.g., substantially elastically deformable, between a planar configuration and an arcuate configuration along at least a portion of a length of the card (e.g., corresponding with the longitudinal axis thereof), wherein the arcuate configuration has a radius of curvature of about 68 mm (2.7 in) or less. In an implementation, the weighted card may be deflectable, e.g., substantially elastically deformable, between a planar configuration and an arcuate configuration along at least a portion of a width of the card (e.g., corresponding with a cross-axis that is transverse, e.g., normal, to the longitudinal axis of the card), wherein the arcuate configuration has a radius of curvature of about 68 mm (2.7 in) or less.

In an embodiment, the weighted card may be deflectable, e.g., substantially elastically deformable, through an angle of at least about 3° per 5.1 mm (0.2 in), and preferably at least about 4.5° per 5.1 mm (0.2 in), along a length of the card (e.g., corresponding with the longitudinal axis thereof).

In the same or other embodiments, the weighted card may be deflectable, (e.g., substantially elastically deformable) through an angle of at least about 5° per 5.1 mm (0.2 in), and preferably at least about 7.5° per 5.1 mm (0.2 in), along a width of the card (e.g., corresponding with a cross-axis that is transversely, e.g., normal to the longitudinal axis of the card). In an implementation, the weighted card may be deflectable, e.g., substantially elastically deformable, through an angle of less than about 20° per 5.1 mm (0.2 in), along a length of the card (e.g., corresponding with the longitudinal axis thereof), and preferably less than about 18.5° per 5.1 mm (0.2 in), along a length of the card (e.g., corresponding with the longitudinal axis thereof). In the same or other embodiments, the weighted card may be deflectable, (e.g., substantially elastically deformable) through an angle of less than about 15° per 5.1 mm (0.2 in), and preferably less than about 12° per 5.1 mm (0.2 in), along a width of the card (e.g., corresponding with a cross-axis that is transversely, e.g., normal to the longitudinal axis of the card).

In an embodiment, the thickness tungsten member may be at least about 0.127 mm (0.005 in), and in an application, the thickness of the tungsten may be at least about 0.191 mm (0.0075 in). In an embodiment, the tungsten member may be less than about 0.4064 mm (0.016 in), and in an implementation, the tungsten member may be less than about 0.254 mm (0.010 in). In an embodiment, the tungsten member comprises a length at least about 50% of the length of the transaction card, and in an application, the length of the tungsten member may be at least about 70% of the length of the transaction card. In an embodiment, the tungsten member may comprise a length less than about 90% of the length of the transaction card, and in an implementation, the tungsten member may comprise a length less than about 85% of the length of the transaction card.

In an embodiment, the tungsten member may comprise a width at least about 50% of the width of the transaction card, and in an implementation, the tungsten member may comprise a width at least about 60% of the width of the transaction card. In an embodiment, the tungsten member may comprise a width less than about 90% of the width of the transaction card, and in an implementation, the tungsten member may comprise a width less than about 80% of the width of the transaction card.

In an embodiment, the tungsten member may comprise a length of at least about 42.8 mm (1.69 in). In an application, the tungsten member may comprise a length of less than about 77.0 mm (3.03 in). In an embodiment, the tungsten member may comprise a width of at least about 27.0 mm (1.06 in). In an application, the tungsten member may comprise a width of less than about 48.6 mm (1.91 in).

In an embodiment, the first layer may include a surround into which the metal portion (e.g., the tungsten member) is inlaid. In this regard, the surround may define an opening into which the tungsten member is received. Accordingly, the surround may include at least a first edge defining the opening that is adjacent to an edge of the tungsten member. In an embodiment, the opening may include a corresponding number of edges as the tungsten member such that the opening is shaped in corresponding relation to the tungsten member. In this regard, the tungsten member may abut the surround along each edge of the tungsten member.

In an embodiment, the opening may extend through the surround so as to define an aperture extending therethrough. In this regard, the thickness of the tungsten member may be substantially the same as the thickness of the surround. Accordingly, opposing major planes of the tungsten member may be coplanar with corresponding opposing major planes of the surround once the tungsten member is inlaid with respect to the surround. As such, the tungsten member and surround may define an inlay layer having a first side and a second side. The first side and the second side may have substantially continuous planar surfaces along the opposing major planes of the tungsten member and the surround.

In an embodiment, an encapsulant may be disposed about the metal portion (e.g., tungsten member). For example, the encapsulant may secure the tungsten member in inlaid relation relative to the surround. In this regard, the encapsulant may extend between edges of the tungsten member and edges of the opening of the surround. In an embodiment, the encapsulant may also extend along the major planes of the tungsten member (e.g., in a case where the tungsten member is thinner than the surround). In any regard, once applied, the encapsulant may create a substantially continuous planar surface along the first and second sides of the inlay layer. The inlay layer may also include a film layer applied along the first and second sides thereof. The film layers may be applied directly to the surround and the tungsten member or may be applied to the surround and the encapsulant covering the tungsten material. In an embodiment, one or more graphics layers may also be attached to the inlay layer. For example, the one or more graphics layers may comprise indicium indicative of an account associated with the transaction card.

In an embodiment, the encapsulant may have a hardness at least about 30% of the hardness of the tungsten member, and in an implementation, the encapsulant may have a hardness at least about 50% of the hardness of the tungsten member. In an application, the encapsulant may have a hardness less than about 95% of the hardness of the tungsten member, and in an implementation, the encapsulant may have a hardness less than about 85% of the hardness of the tungsten member. In an embodiment, the encapsulant may have a modulus of elasticity at least about 30% of the modulus of elasticity of the tungsten member, and in an implementation, the encapsulant may have a modulus of elasticity at least about 50% of the modulus of elasticity of the tungsten material. In an embodiment, the encapsulant may have a modulus of elasticity of less than about 95% of the modulus of elasticity of the tungsten member, and in an application, the encapsulant may have a modulus of elasticity less than about 85% of the modulus of elasticity of the tungsten material.

The encapsulant may include at least one of an epoxy, a resin, a thermoset polymer, a thermoplastic polymer or the like. For example, in various embodiments, the encapsulant may comprise at least one of polypropylene, nylon, polyester, ethylene-polyurethane, polyvinyl butyrate, vinyl chloride, silicone, polyvinyl alcohol, polyvinyl methyl ether, nitrocellulose, polyamide, bismaleimide, polyimide, epoxy polyester hybrid, and/or the like.

In an embodiment, the surround may comprise at least one of polyvinyl chloride (PVC), oriented polyester, polyethylene terephthalate, biaxially-oriented polyethylene terephthalate, or polycarbonate. In an embodiment, the tungsten member may comprise sintered tungsten.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

The present disclosure generally relates to weighted cards and method for manufacturing the same, and in particular to weighted transaction cards that may be used for value in purchases and methods for manufacturing such weighted transaction cards. Specifically, the present disclosure includes cards that include a weighted mass that may comprise at least a portion of a layer of a card. In an embodiment, the weighted mass may be a metallic member. For example, the metallic member may comprise stainless steel, palladium, platinum, gold, silver, or tungsten. In an embodiment, the weighted mass may be a tungsten member. Tungsten may be preferred as the weighted mass because tungsten includes advantageous properties including high density, relatively good workability, and non-toxicity. Accordingly, while reference may be made herein to a tungsten member, it may be appreciated that the description may generally apply to any weighted member (e.g., a weighted member comprising any potential metal described above).

In this regard, a tungsten member that may be incorporated into a transaction card of traditional dimensions may impart significant weight to the finished transaction card. In an embodiment, the tungsten member may be encapsulated such that it is in turn processable by traditional methods used in the production of transaction cards. For example, the encapsulated tungsten member may be processed using traditional hot lamination techniques to laminate the tungsten member with additional card layers. Accordingly, a relatively heavy card (e.g., at least twice, but more preferably 3 to 4 times the weight of a normal transaction card) may be produced relatively inexpensively, using traditional card processing techniques. In contrast, proposed approaches to use of metallic members in cards may not utilize traditional high volume card production techniques such as hot lamination and may in turn rely on costly techniques such as cold rolling, milling, and or other custom approaches to card production.

Figure 1:
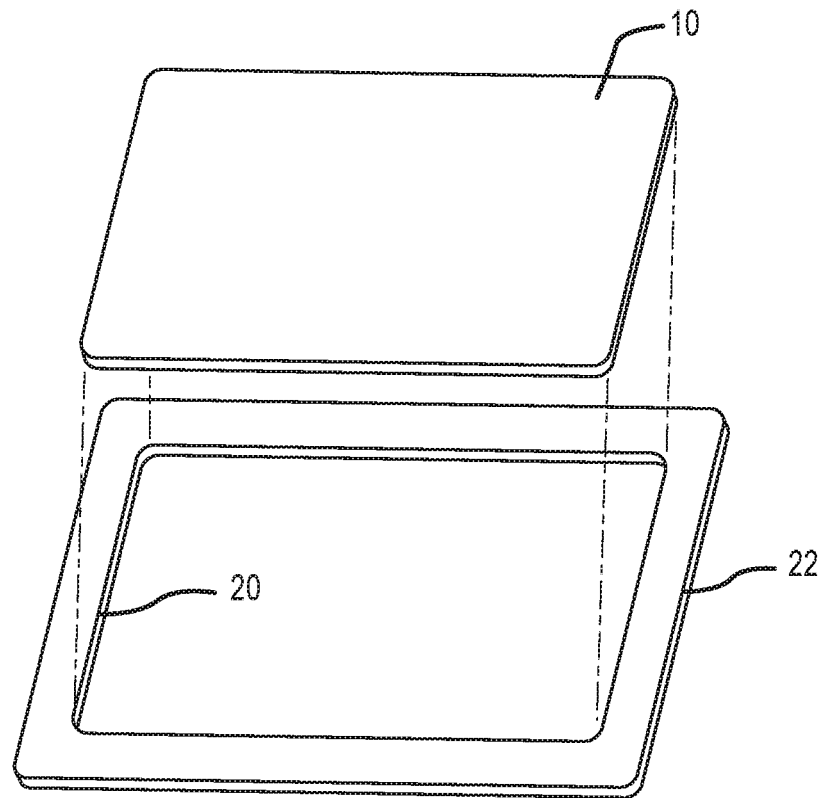
FIG. 1 depicts an embodiment of a tungsten member as disposed in an opening of a surround.

As depicted in FIG. 1, a weighted mass comprising a tungsten member 10 may be inlaid into a surround 22 as depicted in FIG. 1. For example, the tungsten material 10 may comprise primarily tungsten with some preferably small amount of one or more of nickel, iron, copper, or other material. Such additional materials may be present in the tungsten member 10 to increase the workability of the tungsten member 10. As such, the tungsten member 10 may be provided in a relatively thin plate that may correspond in size to a finished transaction card as will be discussed in greater detail below. The tungsten member 10 may be produce by way of a sintering process to form the tungsten member 10. The surround 22 may comprise, for example, a polymer material. Examples of polymeric materials that may comprise the surround may include polyvinyl chloride (PVC), polyethylene glycol (PEG), oriented polyester, biaxially-oriented polyethylene terephthalate (e.g., Melinex® available from DuPont Teijin Films), polycarbonate, or other appropriate material known the card processing art.

The surround 22 may include an opening 20 that may be sized in corresponding relation to the tungsten member 10 so as to accommodate the tungsten member 10 in the opening 20. In this regard, the tungsten member 10 may be received, or inlaid, in the opening 20 of the surround 20. Relatedly, the thickness of the tungsten member 10 may be equal to or less than the thickness of the surround 22 about the opening 20. The opening 20 may be sized to be slightly larger dimensionally in length and width than the tungsten member 10 such that the tungsten member 10 may be received by the opening 20 as depicted in FIG. 2.

Figure 2:
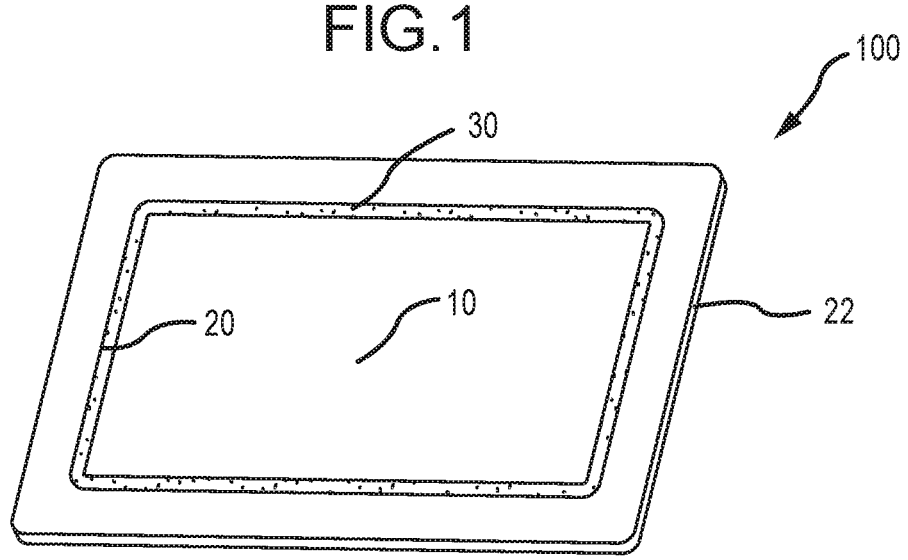
FIG. 2 depicts an embodiment wherein the tungsten member may be secured with respect to the surround by way of an encapsulant.

An encapsulant 30 may be applied to the tungsten member 10 and/or surround 22 so as to fill any space between the tungsten member 10 and the surround 22 as depicted in FIG. 2. The encapsulant 30 may comprise a material that is applied and subsequently allowed to harden to substantially encapsulate the tungsten member 10 to secure the tungsten member 10 within the opening 20 of the surround 22. While depicted in FIG. 2 as being disposed between the tungsten material 10 and the surround 22, it will be appreciated that the encapsulant 30 may, in some embodiments, also substantially surround, or enclose, the tungsten material 10 and/or the surround 22 (i.e., cover all sides thereof). In this regard, the tungsten member 10 may include a surface finish to promote adhesion of the encapsulant 30 and/or a film layer 40 (described in greater detail below). Further still, the surface finish may be decorative and at least partially visible in the finished transaction card as described in greater detail below.

In various embodiments, different materials 30 may be used as the encapsulant 30 to secure the tungsten member 10 in an inlaid fashion with respect to the surround 22. For example, the encapsulant 30 may comprise one or more of epoxy, resin, a thermoset polymer, a thermoplastic polymer, or the like. For example, specific examples may include polypropylene, nylon, polyester, ethylene-polyurethane, polyvinyl butyrate, vinyl chloride, silicone, polyvinyl alcohol, polyvinyl methyl ether, nitrocellulose, polyamide, bismaleimide, polyimide, epoxy polyester hybrid, and/or the like.

Furthermore, the encapsulant 30 may be chosen to have properties to promote adhesion with respect to the tungsten member 10. In this regard, an encapsulant 30 having properties chosen so as to prevent the tungsten member 10 from separating from the surround 22. For example, it may be appreciated that when the tungsten member 10 and the surround 22 are flexed, the tungsten member 10 and the surround 22 may undergo different amounts of deflection for a given force applied. By matching the encapsulant to the tungsten material 10, the amount of differential flexing the tungsten member 10 and the surround 22 undergoes may be minimized to as to reduce the tendency of the tungsten member 10 to separate from the surround 22 once encapsulated with respect thereto. In this regard, it may be appreciated that any separation of the tungsten member 10 from the surround 22 may result in processing defects later in the card manufacture process corresponding to for example, ghosting of graphics, separation of card layers, or other defects.

Therefore, it may be desirable to maintain the tungsten member 10 inlaid within the envelope of the surround 22 defined by opening 20. In this regard, the encapsulant 30 may assist in maintaining the tungsten member 10 inlaid with respect to the surround 22. Accordingly, encapsulant 30 may be chosen to have a hardness and/or flexing properties (e.g., a modulus of elasticity) close to or within a predetermined range of the hardness and/or modulus of elasticity of the tungsten member 10.

For example, the hardness of the tungsten member 10 may be or may approach 2570 MPa on the Brinell hardness scale and the modulus of elasticity may be or may approach approximately 411 GPa. Accordingly, in an embodiment, the encapsulant 30 may have a hardness that is at least about 30% of the hardness of the tungsten member 10, and in an implementation the encapsulant 30 may have a hardness at least about 50% of the hardness of the tungsten member 10. In an application, the encapsulant 30 may have a hardness less than about 95% of the hardness of the tungsten member 10, and in an embodiment, the encapsulant 30 may have a hardness less than about 85% of the hardness of the tungsten member 10. In an embodiment, the encapsulant 30 may have a modulus of elasticity that is at least about 30% of the modulus of elasticity of the tungsten member 10, and in an implementation the encapsulant 30 may have a modulus of elasticity at least about 50% of the modulus of elasticity of the tungsten member 10. In an application, the encapsulant 30 may have a modulus of elasticity less than about 95% of the modulus of elasticity of the tungsten member 10, and in an embodiment, the encapsulant 30 may have a modulus of elasticity less than about 85% of the modulus of elasticity of the tungsten member 10.

In an embodiment, the tungsten member 10 may be sized in corresponding relation to the size of a finished card. For example, the International Organization for Standardization (ISO) may promulgate standards governing the size and/or properties for finished transaction cards. For example, ISO 7810 and/or ISO 7816, both of which are incorporated herein by reference, may specify transaction cards be 85.60 mm (3.375 in) in length by 53.98 mm in width (2.125 in) by 0.76 mm (0.030 in) in thickness. As used herein, the term "length" may correspond to the greatest dimension of the object, the term "width" may correspond to the next smallest dimension of the object than the length, and the term "thickness" may refer to the smallest dimension of the object. Therefore, as stated above, in an embodiment, the tungsten member 10 may have length, width, and height dimensions that are in corresponding relation relative to the finished transaction card in which the tungsten member 10 is incorporated. In an embodiment, the tungsten member 10 may have a length that is at least about 50% of the length of the transaction card, and in an implementation the tungsten member 10 may have a length that is at least about 70% of the length of the transaction card. In an application, the tungsten member 10 may have a length that is less than about 90% of the length of the transaction card, and in an embodiment, the tungsten member 10 may have a length that is less than about 85% of the length of the transaction card. In an embodiment, the tungsten member 10 may have a width that is at least about 50% of the width of the transaction card, and in an implementation, the tungsten member may have a width that is at least about 60% of the width of the transaction card. In an embodiment, the tungsten member 10 may have a width that is less than about 90% of the width of the transaction card, and in an implementation, the tungsten member 10 may have a width that less than about 80% of the width of the transaction card. In an embodiment, the tungsten member 10 may have a thickness that is at least about 10% of the thickness of the transaction card, and in an implementation, the tungsten member 10 may have a thickness that is at least about 20% of the thickness of the transaction card. In an application, the tungsten member 10 may have a thickness less than about 40% of the thickness of the transaction card, and in an embodiment, the tungsten member 10 may have a thickness that is less than about 35% of the thickness of the transaction card. In a preferred embodiment, the tungsten member 10 may have a thickness that is at least about 30% of the thickness of the transaction card.

Figure 16:
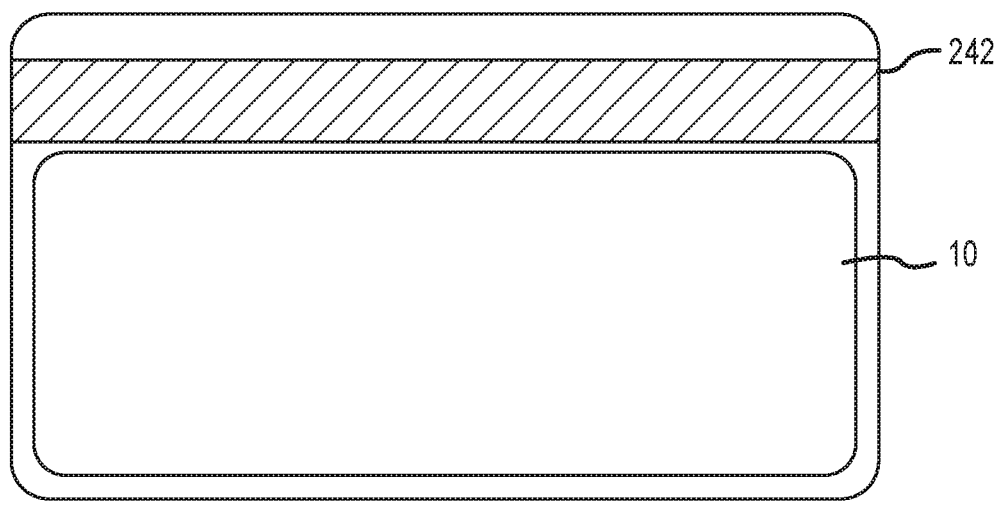
FIG. 16 depicts the placement of a tungsten member relative to a machine readable indicia in an embodiment of a transaction card.

In an application, the tungsten member 10 may have a width of not less than about 30% and not more than about 60% of the width of the transaction card. In this regard, as shown in FIG. 16, the tungsten member 10 may be provided in nonoverlapping relative relation with respect to a machine readable field 242 of the card. In FIG. 16, the position of the tungsten member 10 in the finished transaction card is shown in ghosted lines. In this regard, it may be appreciated that the tungsten member 10 may be provided in the nonoverlapping relative relation with respect to the machine readable field 242 to, for example, prevent interference with the reading of the machine readable field 242 (e.g., such as by a magnetic reader in the case of a magnetic stripe). As may be appreciated, a reduction in the width of the tungsten member 10 may be provided with a corresponding increase in the thickness and/or length of the tungsten member 10 to maintain a weight of the card.

In an embodiment, the length of the tungsten member 10 may be at least about 42.8 mm (1.69 in). In an application, the length of the tungsten member 10 may be less than about 77.0 mm (3.03 in). In an embodiment, the width of the tungsten member 10 may be at least about 27.0 mm (1.06 in). In an application, the width of the tungsten member 10 may be less than about 48.6 mm (1.91 in). In an embodiment, the thickness of the tungsten member 10 may be at least about 0.127 mm (0.005 in). In an application, the thickness of the tungsten member 10 may be less than about 0.254 mm (0.030 in). In a preferred embodiment, the tungsten member 10 may have dimensions of about 73.025 mm (2.875 in) in length by 41.275 mm (1.625 in) in width by 0.254 mm (0.010 in) in thickness.

In an embodiment, the tungsten member 10 may have a density of at least about 15.0 g/cm$^3$. In an implementation, the tungsten member 10 may have a density less than about 19.3 g/cm$^3$. In a preferred embodiment, the tungsten member 10 may have density of about 17.5 g/cm$^3$. In an embodiment, the tungsten member 10 may weigh at least about 8 g, and in an application, the tungsten member 10 may weigh at least about 10 g. In an application, the tungsten member may weigh less than about 22.6 g, and in an implementation, the weight of the tungsten member 10 may be less than about 14 g. In an embodiment, the weight of the tungsten member 10 may represent at least about 40% of the overall weight of the transaction card, and in an implementation, the tungsten member 10 may represent at least about 50% of the overall weight of the transaction card. In an embodiment, the tungsten member 10 may weigh less than about 90% of the overall weight of the transaction card, and in an implementation, the weight of the tungsten member 10 may represent less than about 80% of the overall weight of the transaction card. In an embodiment, the overall weight of the transaction card may be at least about 10 g, and in an implementation, the overall weight of the transaction card may be at least about 15 g. In an embodiment, the overall weight of the transaction card may be at least about 25 g, and in an application, the overall weight of the transaction card may be less than about 20 g. Traditional plastic transaction cards may typically weigh between 4.5 g and about 5.2 g. Accordingly, in an embodiment, a weighted transaction card comprising a tungsten member 10 may weigh at least about two times a traditional plastic transaction card, and in a preferred embodiment, the weighted transaction card may weigh at least 3 times. In an application, the weighted transaction card may weigh less than about five times a traditional plastic transaction card.

In an embodiment, the transaction card may have a substantially even weight distribution across at least a portion of a first dimension (e.g., a length of the card). For instance, the card may have a substantially even weight distribution across at least about 60% of the length of the card. In a more preferred embodiment, the card may have a substantially even weight distribution across at least about 80% of the length of the card. Additionally, the transaction card may have a substantially even weight distribution across at least a portion of a second dimension (e.g., a width of the card). For instance, the card may have a substantially even weight distribution across at least about 60% of the width of the card. In a more preferred embodiment, the card may have a substantially even weight distribution across at least about 80% of the width of the card. The tungsten member 10 may be shaped, sized, and/or positioned relative to the transaction card so that the center of mass of the tungsten member 10 coincides with the centroid of the transaction card.

Additionally, it may be appreciated that a transaction card including a tungsten member 10 may be have a weight distribution that is substantially balanced at least along one dimension of the card. For example, the tungsten member 10 may be sized, shaped, and/or disposed to have symmetric weight distribution along a dimension of the transaction card. For instance, the weight of a first portion of the card along a first half (e.g., a left side) of a dimension (e.g., a length corresponding with the largest dimension of the transaction card) may be substantially the same as the weight of the transaction card along a portion of the card along a second half (e.g., a right side) of a dimension. By substantially the same, the weight of the first half may be no less than about 40% and not more than about 60% of the total weight of the card. The dimension may be the length, width, or thickness of the card. In this regard, the transaction card may have relatively uniform weight along the length of the card. In an embodiment (e.g., where the tungsten member 10 is disposed in nonoverlapping relative relation to a machine readable field), the transaction card may have a weight balance that is nonsymetric along another dimension of the card (e.g., along the width). That is, a first half of the card along a width (e.g., the top) of the card may be lighter than a second half of the card along a width (e.g., the bottom). However, this imbalance of weight along the width may not affect the weight distribution along the length, such that the weight distribution as determined along the length is still balanced along the length.

Further still, a weighted transaction card including the tungsten member may be more rigid than a traditional plastic transaction card. That is, a weighted transaction card may deflect a lesser amount for any given force applied to the weighted card. The amount of flexibility of a card may be quantified in a number of ways. In a first regard, the card may be secured along one side thereof (e.g., along a short side of the card corresponding to the width or along a long side of the card corresponding to length). A force may then be applied at an end of the card opposite end of the secured edge. In turn, the amount of deflection of the card may be measured once the force is applied to quantify the flexibility of the card. In another method of quantifying the flexibility of the card, the card may be exposed to an axial load in the dimension corresponding to the card length or an axial load in the dimension corresponding to the card width. This may result in the card bowing. The amount of deflection of the card (i.e., the distance which the card bows) may be measured as a deflection. In either of the foregoing methods, a weighted transaction card may undergo less of a deflection for a given force in such a test than a traditional plastic transaction card. In an embodiment, for a given test, the weighted transaction card may undergo a reduction in deflection of at least about 30% from the deflection of a traditional plastic transaction card, and in an application, the weighted transaction card may undergo a reduction in deflection of at least about 40% from the deflection of a traditional plastic transaction card. In an application, for a given test, the weighted transaction card may undergo a reduction in deflection of less than about 90% from the deflection of a traditional plastic transaction card, and in an application, the weighted transaction card undergo a reduction in deflection of less about 80% from the deflection of a traditional plastic transaction card.

In a characterization, the weighted card may be deflectable, e.g., substantially elastically deformable, between a planar configuration and an arcuate configuration along at least a portion of a length of the card (e.g., corresponding with the longitudinal axis thereof), wherein the arcuate configuration has a radius of curvature of about 68 mm (2.7 in) or less. In an implementation, the weighted card may be deflectable, e.g., substantially elastically deformable, between a planar configuration and an arcuate configuration along at least a portion of a width of the card (e.g., corresponding with a cross-axis that is transverse, e.g., normal, to the longitudinal axis of the card), wherein the arcuate configuration has a radius of curvature of about 68 mm (2.7 in) or less.

In an embodiment, the weighted card may be deflectable, e.g., substantially elastically deformable, through an angle of at least about 3° per 5.1 mm (0.2 in), and preferably at least about 4.5° per 5.1 mm (0.2 in), along a length of the card (e.g., corresponding with the longitudinal axis thereof). In the same or other embodiments, the weighted card may be deflectable, (e.g., substantially elastically deformable) through an angle of at least about 5° per 5.1 mm (0.2 in), and preferably at least about 7.5° per 5.1 mm (0.2 in), along a width of the card (e.g., corresponding with a cross-axis that is transversely, e.g., normal to the longitudinal axis of the card). In an implementation, the weighted card may be deflectable, e.g., substantially elastically deformable, through an angle of less than about 20° per 5.1 mm (0.2 in), along a length of the card (e.g., corresponding with the longitudinal axis thereof), and preferably less than about 18.5° per 5.1 mm (0.2 in), along a length of the card (e.g., corresponding with the longitudinal axis thereof). In the same or other embodiments, the weighted card may be deflectable, (e.g., substantially elastically deformable) through an angle of less than about 15° per 5.1 mm (0.2 in), and preferably less than about 12° per 5.1 mm (0.2 in), along a width of the card (e.g., corresponding with a cross-axis that is transversely, e.g., normal to the longitudinal axis of the card).

Figure 3:
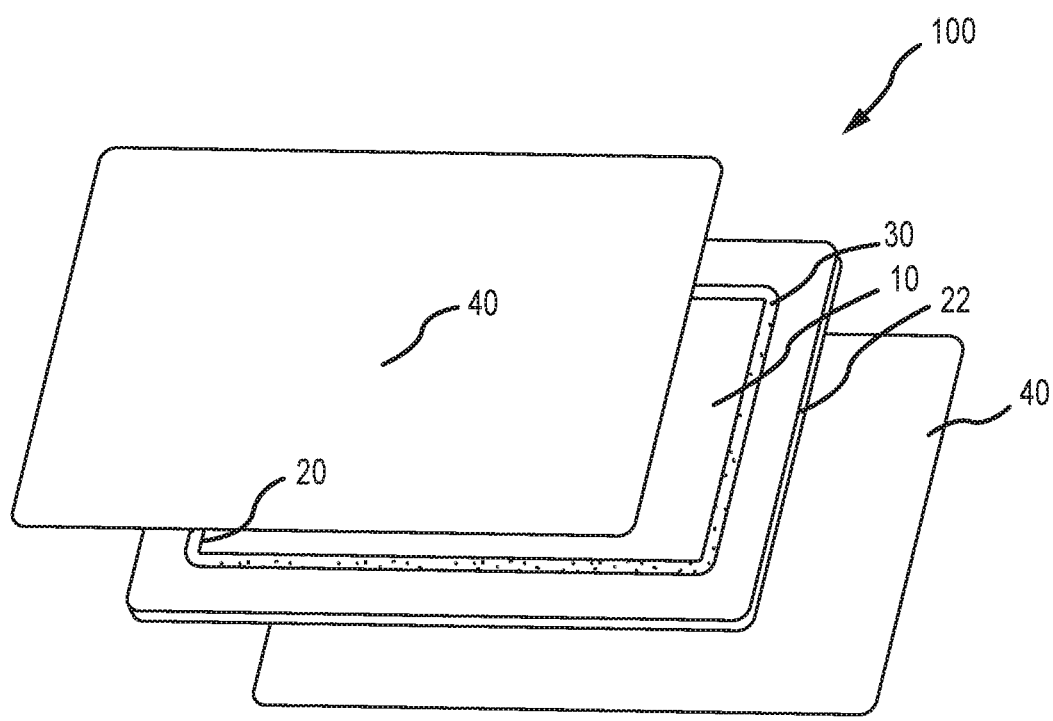
FIG. 3 depicts an embodiment of an inlay.

With further reference to FIG. 3, a film layer 40 may be applied to the surround 22 and the tungsten member 10 inlaid with respect to the surround 22 to further secure the tungsten member 10 within the opening 20. For example, the film layer 40 may assist in a lamination process as will be described in greater detail below. The film layer 40 may be, for example, a polyester, polyvinyl chloride (PVC), polypropylene, polyethylene, acrylic, polycarbonate, and/or the like. The film layer 40 maybe, but is not required to be, transparent. The assembly including the tungsten member 10 inlaid and encapsulated within the opening 20 of the sheet 22 and the film layers 40 applied thereto may be referred to as inlay 100.

Figure 4:
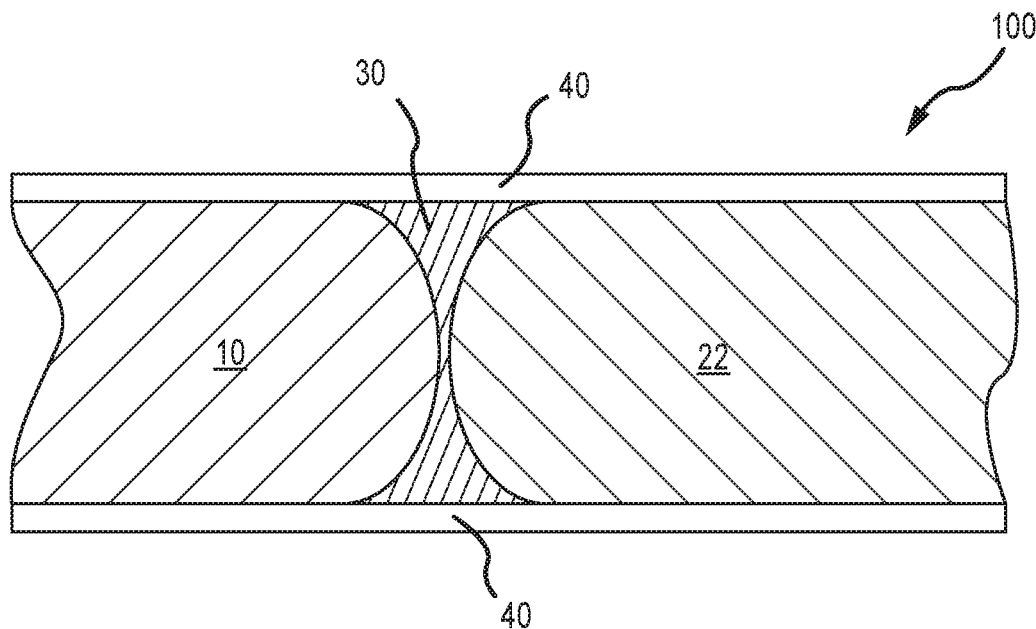
FIG. 4 depicts a cross section of an embodiment of an inlay taken at the boundary of a tungsten member and a surround.

In this regard, with further reference to FIG. 4, a cross sectional view of the inlay 100 is shown along the boundary between the tungsten member 10 and the surround 22. In this regard, it may be appreciated that the opening 20 of the surround 22 may be sized so as to provide some space between the tungsten member 10 and the surround 22. This space may be filled with the encapsulant 30 to secure the tungsten member 10 in the opening 20. While not shown in FIG. 4, as described above in some embodiments, the encapsulant 30 may substantially surround the tungsten member 10 (i.e., extend along all sides thereof) such that a layer of encapsulant 30 may also extend along the tungsten member 10 between the film layer 40 and the tungsten member 10.

Figure 5:
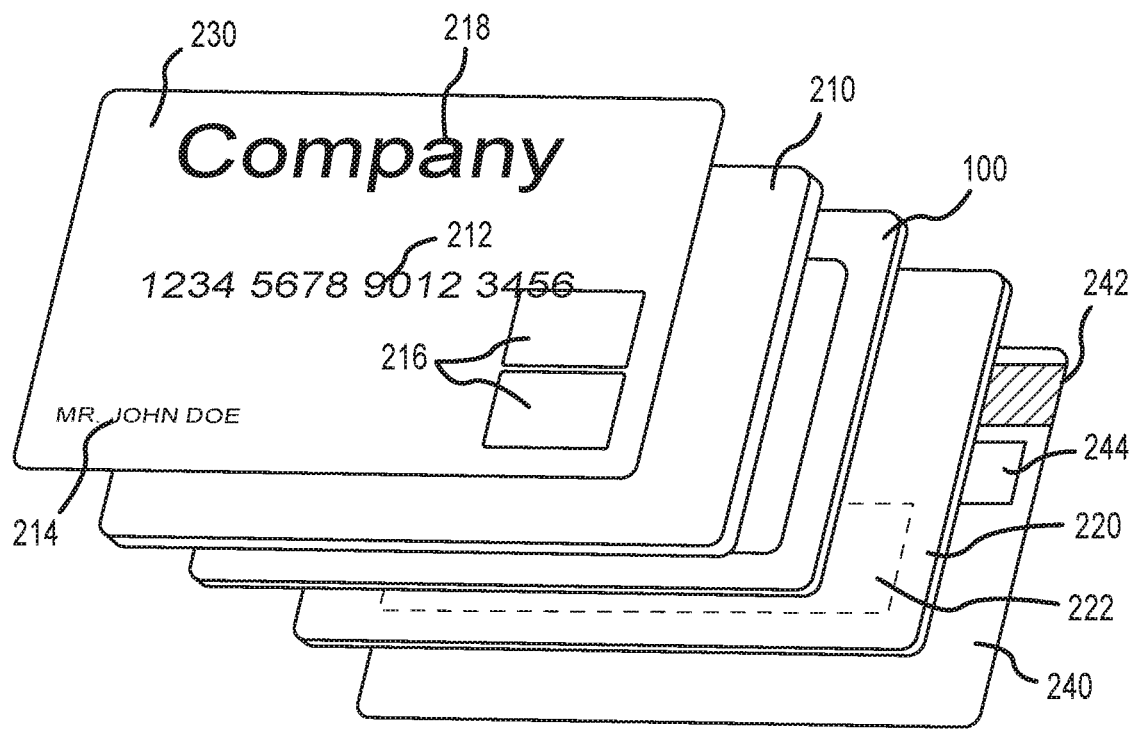
FIG. 5 depicts an embodiment of a plurality of layers of an embodiment of a transaction card.

Turning to FIG. 5, the inlay 100 may be provided between a graphics 210 layer and a second graphics layer 220. That is, the first graphics layer 210 may be disposed adjacent to a first side of the inlay 100 and the second graphics layer 220 may be disposed adjacent to a second side of the inlay 100. The first graphics layer 210 and/or the second graphics layer 220 may be printable layers onto which graphics (e.g., logos, designs, photos, etc.) may be printed. Such graphics may be printed using any known printing technique known in the art such as, for example, screen printing, Gravure printing, lithography, inkjet printing, laser printing, etc. Of note, the graphics layers 210 and 220 may be printed or otherwise produced using traditional high volume card production techniques. The second graphics layer 220 may include a graphics field 222 (e.g., containing terms and conditions or other indicia associated with the finalized transaction card).

Furthermore, the inlay 100, the first graphics layer 210, and the second graphics layer 220 may be disposed between a first transparent film layer 230 and a second transparent film layer 240. The first transparent film layer 230 may include graphics and/or data fields corresponding to the finished transaction card. For example, as shown in FIG. 5, an account number 212, an account owner data field 214, one or more authenticity indicia 216 (e.g., holograms or the like), and/or a graphics field 218 may be printed or otherwise disposed (e.g., applied by way of adhesive or the like) on the first transparent film layer 230. In this regard, the first transparent film layer 230 may include personalization or the like related to a card account and/or card owner. Note that the personalization may be provided via traditional high volume production techniques such as any of the foregoing printing techniques, hot stamping, application of holograms, etc. The second transparent film layer 240 may include a machine readable field 242 and/or a signature field 244 printed thereon. The machine readable field 242 may be written with data corresponding to, for example, indicia indicative of an account to which the transaction card is associated or other information related to the transaction card. The signature field 244 may provide a surface on which the user of the card may write (e.g., to sign the card as part of a verification process).

Figure 6:
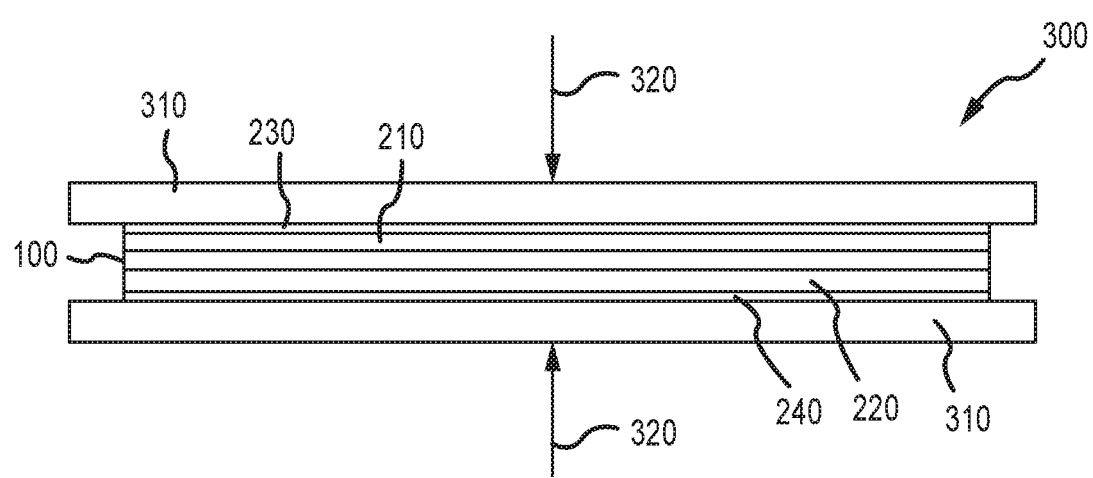
FIG. 6 depicts an embodiment of a transaction card undergoing a hot lamination process.

With further reference to FIG. 6, the first transparent film layer 230, the first graphics layer 210, the inlay 100, the second graphics layer 220, and the second transparent film layer 240 may be disposed into a lamination press 300. The lamination press 300 may include first and second platens 310 between which the various layers are disposed. The platens 310 may include different surface finishes that face the layers stack (e.g., including the transparent film layers 230 and 240, the graphics layers 210 and 220 and the inlay 100) so as to apply a surface finish to the transaction card upon completion of the lamination. For example, a mirrored finish (resulting in a gloss finish on the card) or a satin finish (resulting in a satin finish on the card) may be provided on the platens 310. It may be appreciated that a satin finish may be preferred in at least some embodiments. In this regard, the satin finish on the finished transaction card may reduce the likelihood that "ghosting" of the tungsten member 10 is visible on the exterior surfaces of a finished transaction card. That is, a slightly rougher surface (e.g., a non-glossy surface) may result in any ghosting that may occur with respect to the tungsten member 10 being minimized. In this regard, the surface finish of the finished transaction card may be not less than about 0.15 mircometers (6 microinches) and not more than about 0.403 micrometers (15.9 microinches). Additionally or alternatively, one or more different finishes may be provided on the platens 310 (e.g., including the incorporation of designs or the like by altering the finishes on a given portion of the platen 310).

In any regard, heat and pressure may be applied to the platens 310 in the direction of arrows 320 such that the layer stack becomes laminated. That is, the application of heat and pressure to the first transparent film layer 230, the first printable layer 210, the inlay 100, the second printable layer 220, and the second transparent film layer 240 may result in the lamentation of the various layers resulting in a finished card body. The hot lamination process may include one or more phases of application of heat and/or pressure. For example, during a first phase a constant temperature may be applied to the layer stack at a constant pressure. During a second phase, a constant temperature (e.g., lower than the temperature of the first phase) may be applied and the pressure may be continuously or periodically increased during the second phase. Additional phases including different and/or variable temperatures and/or pressures may be applied to laminate the layer stack.

Figure 7:
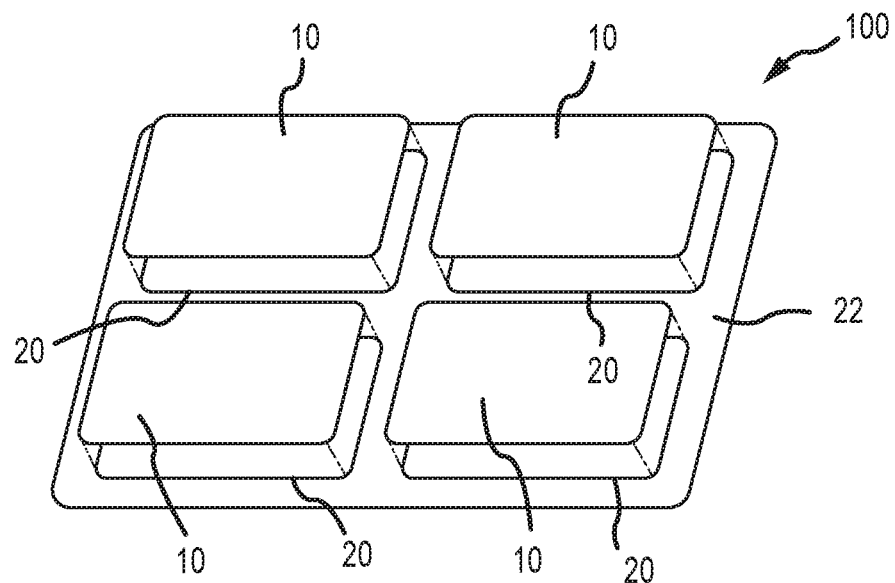
FIGS. 7-8 depict various examples of bulk processing of transaction cards.
Figure 8:
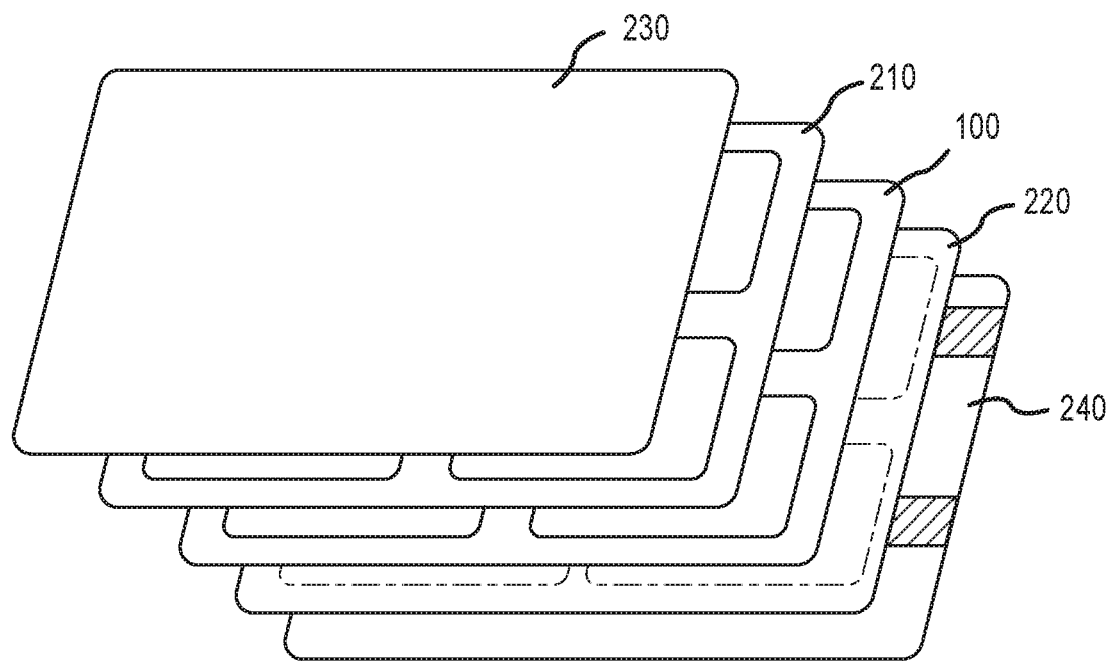

While the foregoing process focused on the production of a single transaction card, it will be appreciated that the process described above may be completed in a bulk manner. In this regard, with further reference to FIG. 7, the inlay 100 may include a plurality of portions corresponding to individual finished transaction cards. In this regard, the plurality of portions corresponding to individual cards may undergo the foregoing process and be later separated (e.g., by way of cutting or punching out the individual card portions). Accordingly, as shown in FIG. 7, a plurality of tungsten members 10 may be inlaid with respect to a plurality of openings 20 of a surround 22. Accordingly, the surround 22 may receive a plurality of tungsten members 10 that may each correspond to an individual card portion. The inlay 100 including the plurality of individual card portions may be processed similarly as described above (i.e., disposed between first and second graphics layers 210 and 220 as well as first and second transparent film layers 230 and 240) and laminated in a bulk operation. In this regard, the first and second graphics layers 210 and 220 as well as first and second transparent film layers 230 and 240 may also have individual card portions including the features described above in relation to each layer for each individual card portion. Accordingly, once the inlay 100 including the plurality of individual card portions has undergone the lamination process, the individual finished cards may be separated from the resulting bulk card sheet. For example, a sheet including 28 or 56 card portions may be provided.

Figure 9:
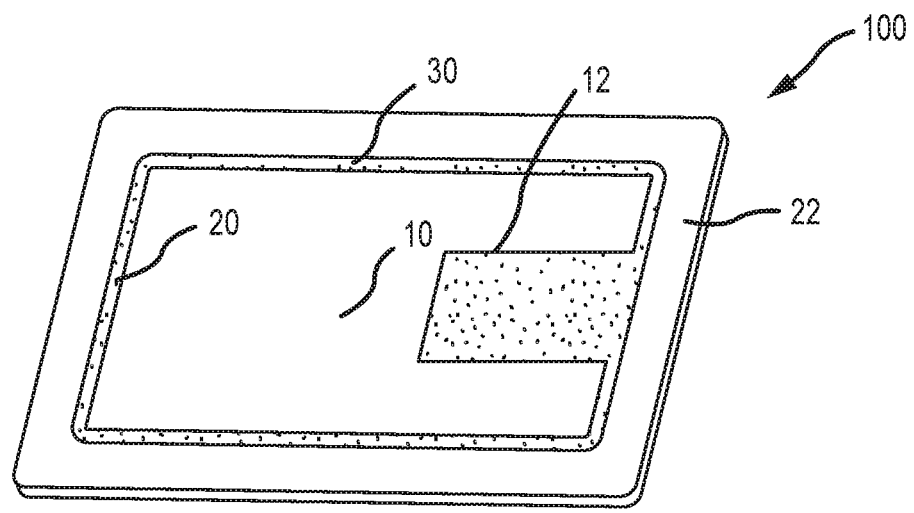
FIG. 9 depicts an embodiment of a tungsten member disposed in a surround having a relief portion provided therein.
Figure 10:
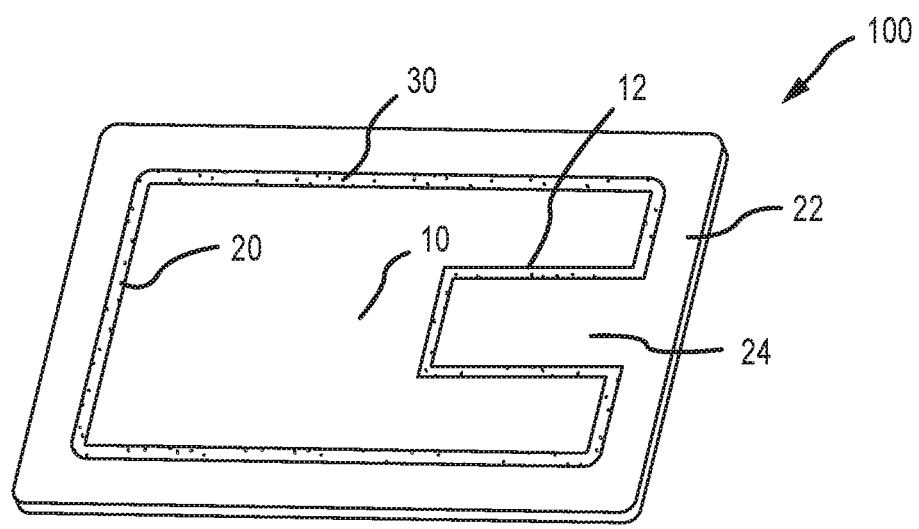
FIG. 10 depicts an embodiment of a tungsten member disposed in a surround, where the tungsten member has a relief portion and the surround has a corresponding projection.
Figure 11:
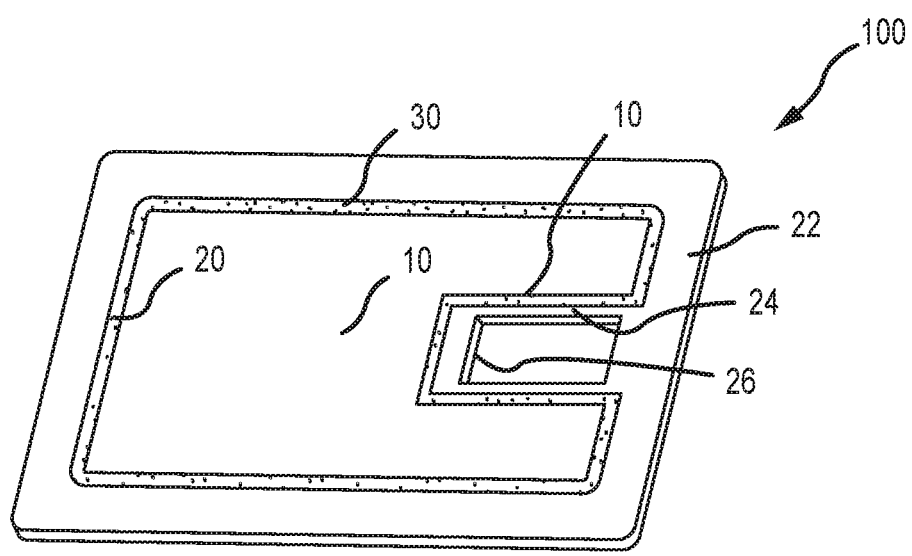
FIG. 11 depicts the embodiment of FIG. 10, with a milled pocket provided in the surround for receipt of a device.
Figure 12:
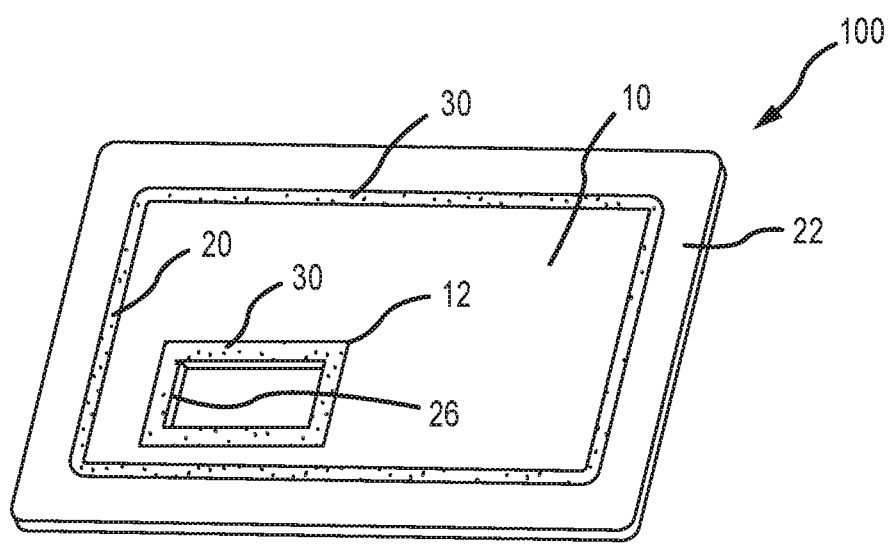
FIG. 12. depicts another embodiment of a tungsten member with a relief portion in which a pocket for receiving a device is milled.

In an implementation, a transaction card may be provided that includes an inset device. The inset device may include, for example, a smart card chip or the like. In an implementation, the inset device may be an EMV chip, a Mifare chip, or other inset device provided on the card. It will be appreciated that when integrating inset devices with transaction cards, the card may be milled to provide a pocket. Accordingly, as depicted in FIG. 9, the tungsten member 10 may include a relief portion 12. The relief portion 12 may provide a space in which a pocket may be milled in a finished card to accommodate an inset device. In this regard, the relief portion 12 of the tungsten member 10 may be sized and positioned so as to avoid any portion of the tungsten member 10 interfering with the milling process. As shown in FIG. 9, encapsulant 30 may be provided in the space defined by the relief portion 12. In an implementation depicted in FIG. 10, the surround 22 may include a projection 24 that extends into the space defined by the relief portion 12. In any regard, as shown in FIG. 11, a pocket 26 may be milled to accommodate in inset device (e.g., an EMV chip). While the pocket 26 is shown in FIG. 12 as being milled into the projection 24 of the surround 22, it may also be appreciated that the encapsulant 30 disposed in the space defined by the relief portion 12 may also be milled. Further still, while the inlay 100 is shown as being milled in FIG. 11, this may be for illustration purposes only. In this regard, it may be appreciated that the finished transaction card (e.g., after lamination) may be milled such that additional layers are milled that are not shown in FIG. 11. In this regard, an inset device may be disposed in the pocket 26.

FIG. 12 shows an embodiment of an inlay 100 where a relief portion 12 is provided that comprises an opening in the tungsten member 10. That is, the relief portion 12 shown in FIG. 12 may be provided such that the tungsten member 10 surrounds the relief portion 12. In this regard, the relief portion 12 need not be positioned at an edge of the tungsten member 10. The relief portion 12 may be filled with encapsulant 30 and subsequently milled to produce a pocket 26 for receiving an inset device. Alternatively, a plug or other portion of material (e.g., a similar material to that of surround 22) may be provided in the relief portion 12 that is milled to produce the pocket 26.

Figure 13:
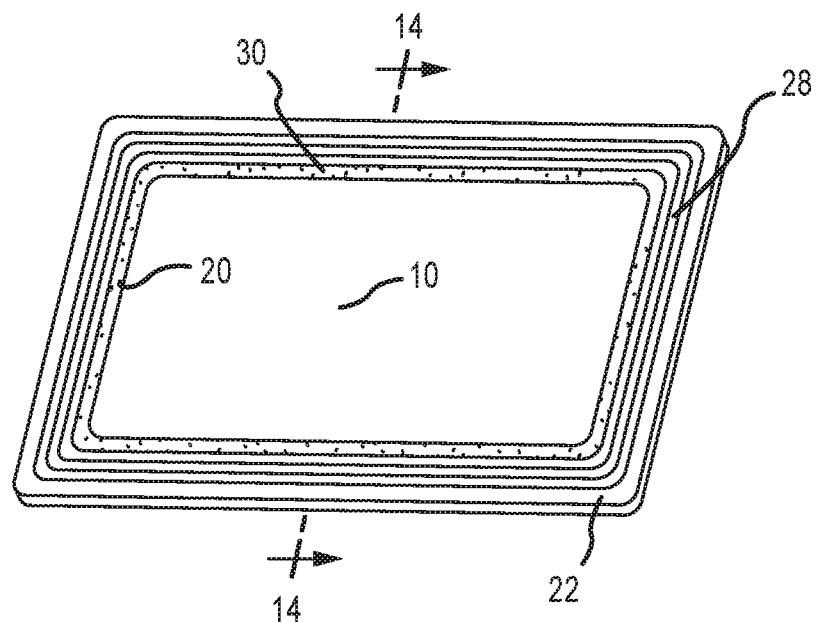
FIG. 13 depicts an embodiment of a tungsten member disposed in a surround having an antenna for wireless communication in a resulting transaction card disposed therewith.
Figure 14A:
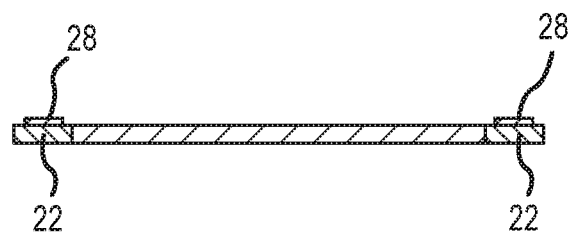
FIGS. 14A and 14B depict cross sectional embodiments of the embodiment of FIG. 13 taken along section line 14-14 in FIG. 13.
Figure 14B:
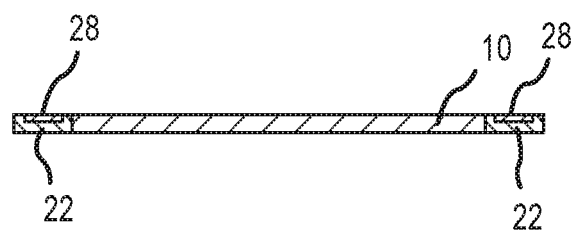

Further still, with reference to FIG. 13, the inlay 100 may be provided with an antenna 28 (e.g., to facilitate wireless or contactless communication with a finished transaction card). With further reference to FIGS. 14A and 14B, various embodiments of the positioning of the antenna 28 relative to the inlay 100 are shown. For example, as shown in FIG. 14A, the antenna 28 may be disposed on a surface of the surround 22. In this regard, the antenna 28 may be provided directly on the surface of the surround 22 (e.g., by way of a deposition process or via an adhesive). While not shown, the antenna 28 may be provided on a layer that extends relative to the inlay 100 (e.g., the antenna 28 and associated substrate may form a layer of the card).

Additionally, as shown in FIG. 14B, the antenna 28 may be inset relative to the surround 22. In this regard, the surround may be formed or processed to include a recess that accommodates the antenna 28. The recess may be milled from the surround 22. In this regard, the antenna 28 may be provided at least partially inset into the surround 22 such that the antenna 28 may not add to the thickness of the finished card.

Figure 15:
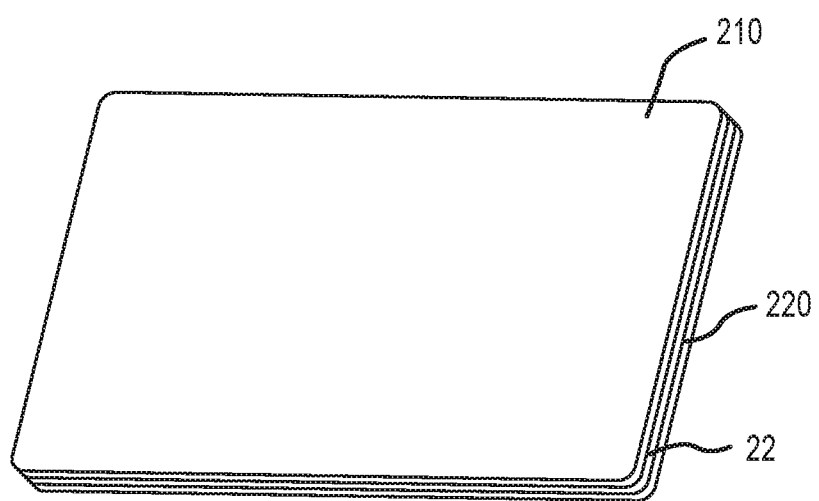
FIG. 15 depicts an embodiment of a transaction card show with an edge of a surround showing at an edge of the transaction card

Additionally, with reference to FIG. 15, it may be appreciated that in a finished transaction card, an edge of a surround 22 may be at least partially exposed at an edge of the transaction card. That is, the layers of the first graphics layer 210, the surround 22, and the second graphics layer 220 may each be visible at an edge of the finished transaction card. In this regard, it may be appreciated that the colors of these layers may be selected to match or contrast. For example, in an embodiment, the color of the surround 22 may be chosen to contrast from at least one of the first graphics layer 210 or the second graphics layer 220 so that the contrasting color of the surround 22 may be visible at a portion of the edge of the finished card. In other embodiments, the color of the surround 22 may be chosen to match the color of at least one of the first graphics layer 210 or the second graphics layer 220 such that the visible portion of the surround 22 at the edge of the finished transaction card may match the edge color of the first graphics layer 210 or the second graphics layer 220.

In an embodiment, the graphics layers 210 and/or 220 and the surround 22 may be substantially opaque. In this regard, in an embodiment of the transaction card, the tungsten member 10 may not be visible at an exterior of the card. That is, the tungsten member may be completely encapsulated by opaque portions such that the tungsten member is not visible.

Figure 17:
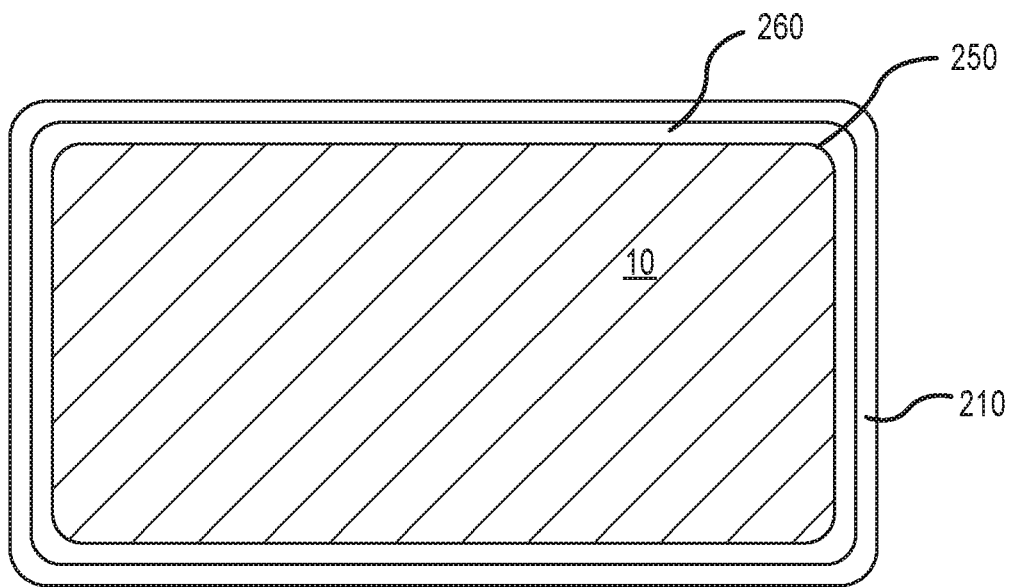
FIG. 17 depicts an embodiment of a transaction card having a transparent member extending relative to a portion of a tungsten member having a surface finish.

In another embodiment, the transaction card may include a transparent or translucent portion so that at least a portion of the tungsten member 10 is visible at an exterior of a transaction card including the tungsten member. As such, with reference to FIG. 17, a front side of a card is shown such that a graphics layer 210 is visible. The graphics layer 210 may include a transparent portion 250. In this regard, the tungsten member 10 may be visible through the transparent portion 250. As may be appreciated, the transparent portion 250 may be disposed some distance from the edge of the graphics layer 210. That is, the transparent portion 250 may include a border 260 surrounding the transparent portion 250. In this regard, the border 260 may be substantially opaque. As such, the border 260 may cover an interface between the tungsten member 10 and the surround 22. In this regard, an edge portion of the tungsten member 10 may be obscured by the border 260. As may be appreciated, if the tungsten member 10 includes a surface roughness (e.g., a textured, potentially decorative surface roughness), the surface roughness may be visible through the transparent portion 250. While one side (e.g., corresponding to the first graphics layer 210) is shown, it may be appreciated that such a transparent portion 250 may be provided on either or both sides of a transaction card.

It may be further appreciated that ISO 7810 and/or ISO 7816, incorporated by reference above, may also prescribe requirements for the physical characteristics of cards such as bending stiffness, flammability, toxicity, resistance to chemicals, car dimensional stability and warpage with temperature and humidity, resistance to deterioration from exposure to light and heat, and durability. It may be appreciated that the foregoing weighted transaction cards and methods of manufacturing the same may result in finished transaction cards that meet the standards set forth in ISO 7810, ISO 7816, and/or any other regulations, rules, or standards applicable to transaction cards.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A transaction card, comprising:
    a metallic member inlaid with respect to a surround to define an inlay layer having a first side and a second side;
    a first film layer applied to the first side of the inlay layer;
    a second film layer applied to the second side of the inlay layer;
    a first graphics layer laminated to the first film layer on the first side; and
    a second graphics layer laminated to the second film layer on the second side;
    wherein at least one of the first graphics layer or the second graphics layer comprises indicium indicative of an account associated with the transaction card.

2. A transaction card according to claim 1, wherein the metallic member comprises at least one of tungsten or sintered tungsten.

3. A transaction card according to claim 1, wherein a weight of the metallic member is at least one of:
    not less than about 8 g and not more than about 22.6 g; or
    not less than about 10 g and not more than about 14 g.

4. A transaction card according to claim 3, wherein a total weight of the transaction card is not less about 10 g and not more than about 25 g.

5. A transaction card according to claim 4, wherein the metallic member comprises a thickness not less than about 0.127 mm (0.005 in) thick and not more than about 0.305 mm (0.012 in).

6. A transaction card according to claim 5, wherein the metallic member comprises:
a length of not less than about 42.8 mm (1.69 in) and not more than about 77.0 mm (3.03 in); and
a width of not less than about 27.0 mm (1.06 in) and not more than about 48.6 mm (1.91 in).

7. A transaction card according to claim 1, wherein:
the surround comprises at least one of polyvinyl chloride (PVC), oriented polyester, polyethylene terephthalate, biaxially-oriented polyethylene terephthalate, or polycarbonate; and
the first film layer and the second film layer comprises at least one of polyester, PVC, polypropylene, polyethylene, acrylic, polycarbonate.

8. A transaction card according to claim 1, wherein the first graphics layer and the second graphics layer are laminated to the first film layer, the second film layer and the inlay layer by way of a hot lamination process.

9. A transaction card according to claim 8, wherein a surface finish of the transaction card is not less than about 0.15 mircometers (3.93 microinches) and not more than about 1 micrometer (39.4 microinches).

10. A transaction card according to claim 1, wherein the metallic member comprises a relief portion of a size corresponding to an inset device to be provided on the transaction card and the surround comprises a corresponding projection extending with respect to the relief portion.

11. A transaction card according to claim 10, wherein the transaction card comprises a milled pocket in an area corresponding to the relief portion, wherein the milled pocket is configured to accommodate the inset device.

12. A transaction card according to claim 1, wherein the metallic member comprises a surface roughness of not less than about 0.1 mircometers (6 microinches) and not more than about 1.0 micrometers (15.9 microinches).

13. A transaction card according to claim 12, wherein the surface roughness of the metallic member comprises a pattern consisting of at least one of: a brushed metal, a diamond plate, or a geometric pattern.

14. A transaction card according to claim 1, further comprising:
an antenna member disposed between the first graphics layer and the second graphics layer, wherein the antenna member is at least one of a discrete layer in the transaction card or at least partially embedded in the surround.

15. A transaction card, comprising:
a tungsten member;
a polyvinyl chloride (PVC) film layer coupled to at least a first side and a second side of the tungsten member and with the tungsten member defining a first layer; and
an indicia layer attached to the first layer comprising at least one indicium indicative of an account associated with the transaction card, wherein the indicia layer is laminated to the PVC film layer on the first side and the second side of the tungsten member.

16. A transaction card according to claim 15, wherein a weight of the tungsten member is one of:
not less than about 8 g and less than about 22.6 g; or
not less than about 10 g and not more than about 14 g; or
not less than about 10 g and not more than about 25 g.

17. A transaction card according to claim 15, wherein the tungsten member is not less than about 0.127 mm (0.005 in) and not more than about 0.305 mm (0.012 in).

18. A transaction card according to claim 17, wherein the tungsten member comprises:
a length of not less than about 42.8 mm (1.69 in); and
a width of not less than about 27.0 mm (1.06 in).

19. A method for producing a weighted transaction card, comprising:
inlaying a tungsten member with respect to a surround;
applying a film layer onto the tungsten member and the surround to define an inlay layer;
disposing the inlay layer between first and second graphic layers;
applying heat and pressure to the first graphic layer, the inlay, and the second graphic layer; and
laminating the first graphic layer, the inlay, and the second graphic layer in response to the applying of the heat and pressure to form the weighted transaction card, wherein the film layer assists in laminating the first graphic layer, the inlay, and the second graphic layer to one another.

20. A method according to claim 19, wherein the laminating is performed free from cold rolling.

21. A method according to claim 19, further comprising:
separating the weighted transaction card from a sheet of material.

* * * * *